(12) United States Patent
Chiang et al.

(10) Patent No.: US 8,064,707 B2
(45) Date of Patent: Nov. 22, 2011

(54) IMAGE RECOGNITION METHOD AND IMAGE RECOGNITION APPARATUS

(75) Inventors: Jia-Jie Chiang, Taoyuan County (TW); Po-Hsuan Liao, Taoyuan County (TW); Cheng-Wei Lin, Taoyuan County (TW)

(73) Assignee: Quanta Computer, Inc. (TW)

( * ) Notice: Subject to any disclaimer, the term of this patent is extended or adjusted under 35 U.S.C. 154(b) by 1019 days.

(21) Appl. No.: 11/987,961

(22) Filed: Dec. 6, 2007

(65) Prior Publication Data
US 2009/0010547 A1    Jan. 8, 2009

(30) Foreign Application Priority Data

Jul. 6, 2007 (TW) ................................ 96124686 A

(51) Int. Cl.
*G06K 9/36* (2006.01)
*G06K 9/46* (2006.01)
(52) U.S. Cl. ........................ 382/207; 382/250
(58) Field of Classification Search ................. 382/181, 382/218–220, 207, 232, 233, 250, 277, 299; 375/240.03, 240.04, 240.16, 240.21, E7.099, 375/E7.14, E7.206, E7.2, 11, E7.221; 345/502, 345/520; 358/520, 539; 700/17, 24–25, 700/83, 87; 708/402; 709/223, 227; 712/16, 712/36; 715/810, 840–841
See application file for complete search history.

(56) References Cited

U.S. PATENT DOCUMENTS

| | | | | |
|---|---|---|---|---|
| 5,383,037 A | * | 1/1995 | Kimura et al. | 358/539 |
| 5,452,466 A | * | 9/1995 | Fettweis | 712/36 |
| 5,719,958 A | * | 2/1998 | Wober et al. | 382/199 |
| 5,793,658 A | * | 8/1998 | Adiletta | 708/402 |
| 5,943,502 A | * | 8/1999 | Sariel et al. | 712/16 |
| 6,047,089 A | * | 4/2000 | Abe | 382/250 |
| 6,141,456 A | * | 10/2000 | Pearlstein et al. | 382/250 |
| 6,400,996 B1 | | 6/2002 | Hoffberg | |
| 6,584,154 B1 | * | 6/2003 | Wu | 375/240.16 |
| 6,587,590 B1 | * | 7/2003 | Pan | 382/250 |
| 6,930,689 B1 | * | 8/2005 | Giacalone et al. | 345/502 |
| 7,352,811 B2 | * | 4/2008 | Stone et al. | 375/240.03 |
| 2009/0010547 A1 | * | 1/2009 | Chiang et al. | 382/207 |

FOREIGN PATENT DOCUMENTS

| | | |
|---|---|---|
| CN | 1797471 A | 12/2004 |
| TW | 200420115 | 10/2004 |

OTHER PUBLICATIONS

Office Action in Related Taiwan Patent Application No. 096124686, 2001.
English Translation of Office Action in Related Taiwan Patent Application No. 096124686, 2007.
English Abstract of TW200420115, 2003.

* cited by examiner

*Primary Examiner* — Amir Alavi
(74) *Attorney, Agent, or Firm* — Thomas, Kayden, Horstemeyer, Risley, LLP.

(57) ABSTRACT

The invention provides an image recognition method. First, it is judged whether a set of discrete cosine transform (DCT) coefficients corresponding to an image and/or a set of texture parameters corresponding to the DCT coefficients exist. If the judgment is no, the image is selectively performed a DCT or an inverse discrete cosine transform (IDCT) to generate the set of DCT coefficients based on a format of the image. Based on the set of DCT coefficients, the set of texture parameters is then generated. Afterward, the set of texture parameters is compared with a set of target texture parameters to generate a recognition result.

22 Claims, 3 Drawing Sheets

IMAGE RECOGNITION METHOD AND IMAGE RECOGNITION APPARATUS

BACKGROUND OF THE INVENTION

1. Field of the Invention

The invention relates to image processing, and particularly, to an image recognition method and an image recognition apparatus.

2. Description of the Prior Art

In recent years, with the continuous advance of image technology, the digital image related technology also develops very fast. At present, most photos are taken in a digital way (e.g., with a digital camera) and saved in a digital format (e.g., a memory card, a compact disk, or a hard disk). Because the digital image recognition technology can be widely used in the monitor managing system and the guarding system, it has a developing potential. Most of the conventional image recognition technologies recognize the digital image by performing a pixel-to-pixel comparison between images. However, the recognition rate of this digital image recognition technology is quite slow and the efficiency is low. If there is a large quantity of digital images needed to be recognized, a lot of time and system resources will be wasted to perform the recognition.

Therefore, the scope of the invention is to provide an image recognition method and apparatus to solve the above problems.

SUMMARY OF THE INVENTION

An embodiment according to the invention is an image recognition method. In the embodiment, the method firstly judges whether a set of discrete cosine transform (DCT) coefficients corresponding to an image and/or a set of texture parameters corresponding to the set of DCT coefficients exist. If the answer is no, the method will generate the set of DCT coefficients by selectively performing a DCT or an inverse discrete cosine transform (IDCT) to the image according to a format of the image, and generating the set of texture parameters according to the set of DCT coefficients. Then, the method compares the set of texture parameters with a set of target texture parameters to generate a recognition result.

Because the DCT coefficients of the image correspond to the texture characteristics, the image recognition method is capable of comparing the texture characteristics of these images by comparing the DCT coefficients or texture parameters respectively corresponding to the images to achieve the effect of image recognition.

The advantage and spirit of the invention may be understood by the following recitations together with the appended drawings.

BRIEF DESCRIPTION OF THE APPENDED DRAWINGS

DETAILED DESCRIPTION OF THE INVENTION

In the invention, due to the quantifiable characteristic of the texture of the digital image, the DCT is performed on a digital image to extract the texture characteristic and the image recognition is performed according to the texture characteristic. At present, the DCT is mainly applied to the JPEG compressing technology, and all the processes of converting other types of images (e.g., the BMP image) into JPEG images include the step of DCT.

For example, in the process of converting a colored BMP image into a JPEG image, the steps such as the grey level transform sampling, DCT transforming, quantifying and coding, are included. Because the step of DCT is included, a set of DCT coefficients corresponding to the image will be generated in the process. The set of DCT coefficients can be used to show the texture characteristic of the BMP image. On the other hand, a set of DCT coefficients corresponding to the JPEG image can also be generated by performing an inverse discrete cosine transform (IDCT) to the JPEG image.

Figure 1:
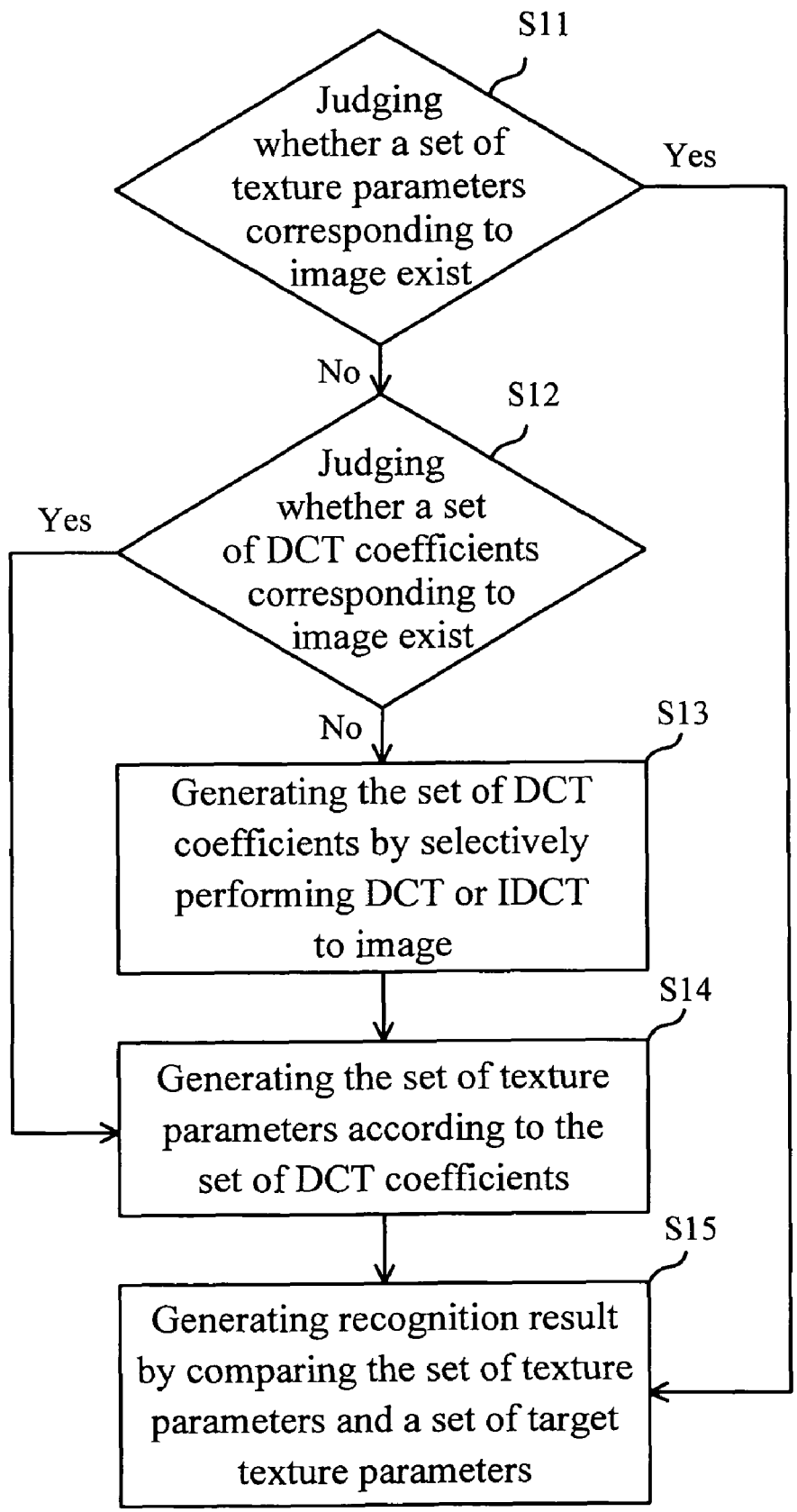
FIG. 1 shows the flowchart of the image recognition method in the first embodiment according to the invention.

The first embodiment according to the invention is an image recognition method. The method can be applied for the recognition of a digital image. Please refer to FIG. 1. FIG. 1 shows the flowchart of the image recognition method. As shown in FIG. 1, in the embodiment, step S11 is firstly performed for judging whether a set of DCT coefficients corresponding to an image exists.

If the judgment of step S11 is no, step S12 is performed for judging whether a set of texture parameters corresponding to the set of DCT coefficients exists. If the answer acquired from step S12 is no, step S13 is performed for generating the set of DCT coefficients by selectively performing a DCT or an IDCT to the image. Then, step S14 is performed for generating the set of texture parameters according to the set of DCT coefficients. Finally, step S15 is performed to compare the set of texture parameters with a set of target texture parameters to generate a recognition result. If the answer acquired from step S11 is yes, step S15 is directly performed to compare the set of texture parameters with a set of target texture parameters to generate a recognition result.

If the answered acquired form the judgment of step S12 is yes, step S14 is directly performed to generate the set of texture parameters according to the set of DCT coefficients. Then, step S15 is performed to compare the set of texture parameters with a set of target texture parameters to generate a recognition result. If the set of target texture parameters corresponds to a target image, the resemblance between the image and the target image can be shown by the recognition result.

According to the invention, the DCT coefficients generated during the process of converting each of the BMP images into a JPEG image can be pre-stored according to the recognition requirement afterward. On the other hand, if the texture parameter corresponding to certain image is already generated beforehand, the texture parameter can also be stored. By doing so, when the image recognition is requested by the user again, the DCT coefficients and texture parameters of the image do not need to be recalculated by the method and the apparatus according to the invention.

Figure 2:
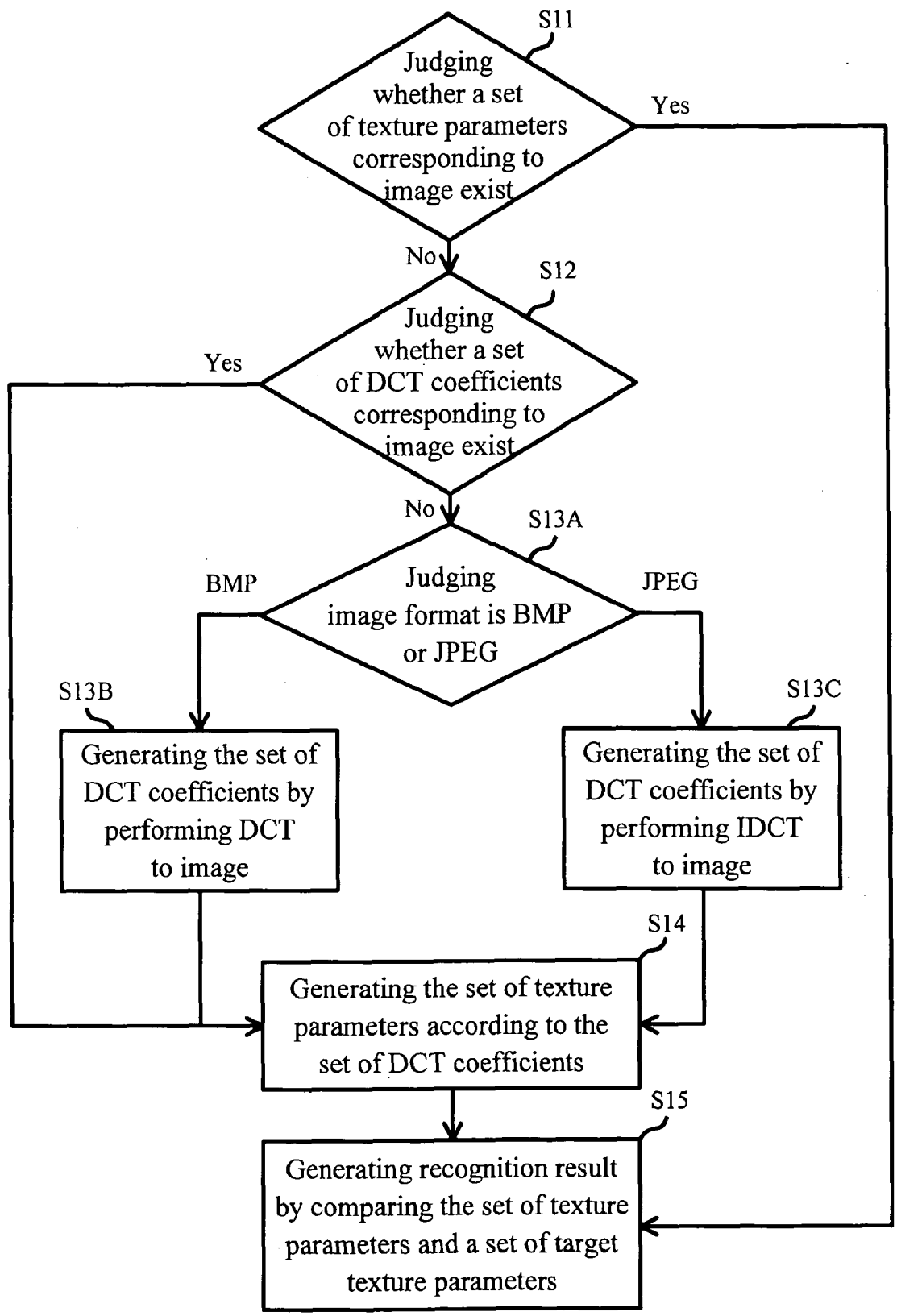
FIG. 2 shows the detail flowchart of possible performing ways of the step S13 in FIG. 1.

Please refer to FIG. 2. FIG. 2 further shows the flowchart of the detail of step S13 in FIG. 1. As shown in FIG. 2, when the formats of the images are different, the steps performed by the method are also different. In the embodiment, the two image forms JPEG and BMP are taken as examples. In practical applications, the method can be applied to the image recognition for images of different formats.

The steps S11, S12, S14, and S15 in FIG. 2 are the same with those shown in FIG. 1, so they will not be described again. In the embodiment, if the answer acquired from the judgment of the step S12 is no, then step S13A will be performed to judge whether the format of the image is the BMP format or the JPEG format. If the format of the image is the BMP format, then step S13B will be performed to generate the set of DCT coefficients by performing the DCT to the image. In addition, before the DCT is performed, the grey level transforming can be performed to the BMP image. On the other side, if the format of the image is the JPEG format, then step S13C will be performed for generating the set of DCT coefficients by performing the IDCT to the image. After steps S13B and S13C are performed, the set of DCT coefficients can be further stored. The set of texture parameters can also be further stored after step S14 is performed.

In practical applications, based on the characteristic of the DCT coefficients, the set of texture parameters can include a first smooth texture energy ($E_{DC1}$), a first vertical/horizontal texture energy ratio [($E_{V1}/E_{H1}$)], and a first oblique texture energy ($E_{S1}$). For example, if the smooth texture energy corresponding to an image is very high, it may show that the image includes a lot of smooth regions. Accordingly, the set of target texture parameters can include a target smooth texture energy ($E_{DC}$), a target vertical/horizontal texture energy ratio [($E_V/E_H$)] and a target oblique texture energy ($E_S$). Because the above mentioned energy or energy ratio can correspond to the texture characteristics of the image, when step S15 is performed, the recognition result is generated according to $E_{DC1}$, ($E_{V1}/E_{H1}$), $E_{S1}$, $E_{DC}$, ($E_V/E_H$), and $E_S$. If D represents the recognition result, then D can be expressed as:

$$D = a \times |E_{DC1} - E_{DC}| + b \times \left| \frac{E_{V1}}{E_{H1}} - \frac{E_V}{E_H} \right| + c \times |E_{S1} - E_S|,$$

wherein a, b, and c are weighing coefficients.

In fact, the user or computer system may want to recognize the image which is most similar to the target image from the candidate images. The condition of considering a plurality of candidate images can also be further included according to the method of the invention. It assumes that there are a total of N candidate images, wherein N is a positive integer. According to the method of the invention, the steps shown in FIG. 1 can be performed to the N images to generate a candidate recognition result corresponding to each of the candidate images respectively. According to the candidate recognition results, a resulting image which is most similar to the target image can be selected from the N candidate images.

In other words, the degree of similarity between the N candidate images and the target image can be known according to the candidate recognition results obtained by the method. And, the N candidate images can be arranged according to the different degrees of similarity. So the image which is most similar to the target image or with other degrees of similarity can be selected by the user.

For example, it assumes that there are all together five candidate images. Thus, five candidate recognition results will be obtained after the steps shown in FIG. 1 are performed to each of the candidate images. If the degrees of similarity between the candidate images and the target image shown by the five candidate recognition results are 65%, 77%, 86%, 93%, and 98% respectively, the image with a 98% degree of similarity to the target image will be selected as the requested result image.

Figure 3:
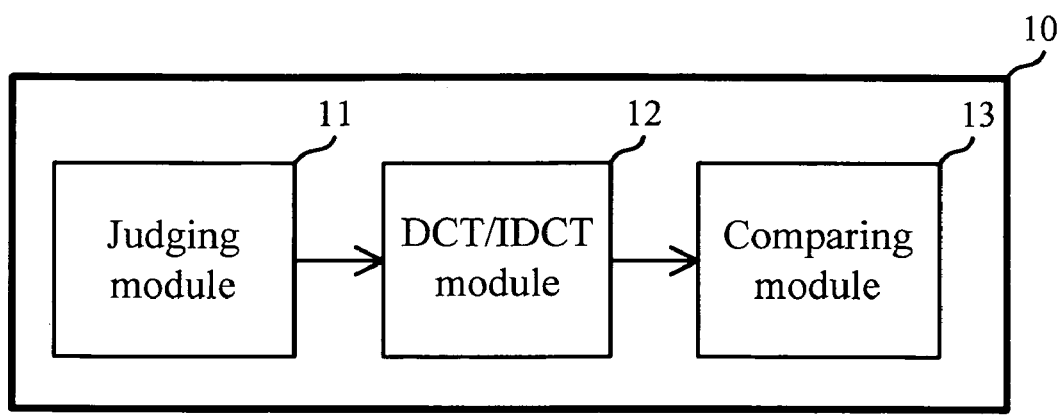
FIG. 3 shows the functional block diagram of the image recognition apparatus in the second embodiment according to the invention.

The second embodiment according to the invention is an image recognition apparatus. Please refer to FIG. 3. FIG. 3 shows the functional block diagram of the image recognition apparatus in the second embodiment according to the invention. As shown in FIG. 3, the image recognition apparatus 10 includes a judging module 11, a DCT/IDCT module 12, and a comparing module 13. The judging module 11 is used for judging whether a set of DCT coefficients corresponding to an image and/or a set of texture parameters corresponding to the set of DCT coefficients exist. The DCT/IDCT module 12 is electrically connected to the judging module 11. If the answered acquired from the judgment of the judging module 11 is no, the DCT/IDCT module 12 will selectively perform a DCT or an IDCT to the image according to a format of the image to generate the set of DCT coefficients, and generate the set of texture parameters according to the set of DCT coefficients. The comparing module 13 is electrically connected to the DCT/IDCT module 12, and used for comparing the set of texture parameters with a set of target texture parameters to generate a recognition result.

In addition, if the judgment of the judging module 11 shows that the set of texture parameters has already existed, the comparing module 13 will compare the set of texture parameters with the set of target texture parameters to generate the recognition result. If the judgment of the judging module 11 is that the set of DCT coefficients has already existed, but the set of texture parameters does not exist, the DCT/IDCT module 12 will generate the set of texture parameters according to the set of DCT coefficients, and the comparing module 13 will compare the set of texture parameters with the set of target texture parameters to generate the recognition result.

For example, if the format is a BMP format, the DCT is performed to the image by the DCT/IDCT module 12. The image recognition apparatus 10 can further include a grey level transform module (not shown in the figure). The grey level transform module is used for performing a grey level transform to the image before the DCT is performed by the DCT/IDCT module. On the other hand, if the format is a JPEG format, the IDCT can be performed to the image by the DCT/IDCT module 12. The apparatus can further include a storing module (not shown in the figure). The storing module is electrically connected to the DCT/IDCT module 12, and used for storing the set of DCT coefficients and/or the set of texture parameters.

Figure 4:
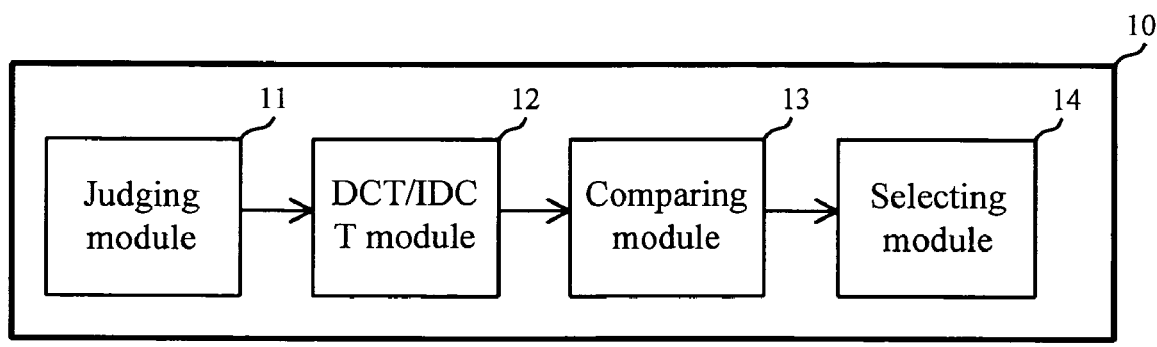
FIG. 4 shows the functional block diagram of the image recognition apparatus shown in FIG. 3 further includes a selecting module.

In fact, the user or computer system may want to recognize from the candidate images the image which is most similar to the target image. The condition of considering a plurality of candidate images can also be further included in the apparatus according to the invention. It assumes that there are totally N candidate images, wherein N is a positive integer. The judging module 11, the DCT/IDCT module 12, and the comparing module 13 can be performed to the N images respectively to generate a candidate recognition result corresponding to each of the candidate images. As shown in FIG. 4, the image recognition apparatus 10 can further include a selecting module 14. The selecting module 14 is electrically connected to the comparing module 13, and used for selecting a resulting image which is most similar to the target image from the N candidate images according to the candidate recognition results.

Compared to the prior art, a DCT or an IDCT is used for obtaining a set of DCT coefficients corresponding to an image in the image recognition method and apparatus according to the invention. Because the set of DCT coefficients correspond to the texture characteristic of the image, the effect of image recognition can be achieved by respectively comparing sets of DCT coefficients corresponding to images and/or the texture parameters corresponding to the DCT coefficients. Compared to the conventional image recognition technology which recognizes the image by performing a pixel-to-pixel comparison between images, the image recognition method and apparatus according to the invention not only improve the image recognition rate, but also largely save the cost of image recognition.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image recognition method, comprising the steps of:
   (a) using a judging module of a computer system to judge whether a set of discrete cosine transform (DCT) coefficients corresponding to an image and/or a set of texture parameters corresponding to the set of DCT coefficients exist;
   (b) if the judgment of step (a) is no, using a DCT/IDCT module of the computer system to generate the set of DCT coefficients by selectively performing a DCT or an inverse discrete cosine transform (IDCT) to the image according to a format of the image, and generating the set of texture parameters according to the set of DCT coefficients; and
   (c) using a comparing module of the computer system to compare the set of texture parameters with a set of target texture parameters to generate a recognition result.

2. The method of claim 1, further comprising the step of:
   (d) if the judgment of step (a) is that the set of texture parameters has existed, comparing the set of texture parameters with the set of target texture parameters to generate the recognition result.

3. The method of claim 1, further comprising the step of:
   (e) if the judgment of step (a) is that the set of DCT coefficients has existed, but the set of texture parameters does not exist, generating the set of texture parameters according to the set of DCT coefficients, and comparing the set of texture parameters with the set of target texture parameters to generate the recognition result.

4. The method of claim 1, wherein if the format is a BMP format, the DCT is performed to the image in step (b).

5. The method of claim 4, further comprising the step of:
   (f) before the DCT is performed, performing a grey level transform to the image.

6. The method of claim 1, wherein if the format is a JPEG format, the IDCT is performed to the image in step (b).

7. The method of claim 1, wherein the set of texture parameters comprises a first smooth texture energy ($E_{DC1}$), a first vertical/horizontal texture energy ratio [($E_{V1}/E_{H1}$)] and a first oblique texture energy ($E_{S1}$), the set of target texture parameters comprises a target smooth texture energy ($E_{DC}$), a target vertical/horizontal texture energy ratio [($E_V/E_H$)] and a target oblique texture energy ($E_S$), and in step (c), the recognition result is generated according to $E_{DC1}$, ($E_{V1}/E_{H1}$), $E_{S1}$, $E_{DC}$, $E_V/E_H$, and $E_S$.

8. The method of claim 7, wherein the recognition result (D) can be represented as:

$$D = a \times |E_{DC1} - E_{DC}| + b \times \left| \frac{E_{V1}}{E_{H1}} - \frac{E_V}{E_H} \right| + c \times |E_{S1} - E_S|,$$

wherein a, b, and c are weighing coefficients.

9. The method of claim 1, wherein the set of target texture parameters corresponds to a target image, and the recognition result is a degree of similarity between the image and the target image.

10. The method of claim 9, wherein the image is among the N candidate images, N is a positive integer, and each of the N candidate images corresponds to a candidate recognition result respectively, the method further comprising the step of:
    (g) selecting a resulting image which is most similar to the target image from the N candidate images based on the recognition results of the candidates.

11. The method of claim 1, further comprising the step of:
    (h) after step (b) is performed, storing the set of DCT coefficients and/or the set of texture parameters.

12. An image recognition apparatus, comprising:
    a judging device, for judging whether a set of discrete cosine transform (DCT) coefficients corresponding to an image and/or a set of texture parameters corresponding to the set of DCT coefficients exist;
    a DCT/IDCT device, electrically connected to the judging device, if the judgment of the judging device is no, generating the set of DCT coefficients by selectively performing a DCT or an inverse discrete cosine transform (IDCT) to the image according to a format of the image, and generating the set of texture parameters according to the set of DCT coefficients; and
    a comparing device, electrically connected to the DCT/IDCT device, for comparing the set of texture parameters with a set of target texture parameters to generate a recognition result.

13. The apparatus of claim 12, wherein if the judgment of the judging device is that the set of texture parameters has existed, the comparing device compares the set of texture parameters with the set of target texture parameters to generate the recognition result.

14. The apparatus of claim 12, wherein if the judgment of the judging device is that the set of DCT coefficients has existed, but the set of texture parameters does not exist, the DCT/IDCT device generates the set of texture parameters according to the set of DCT coefficients, and the comparing device compares the set of texture parameters with the set of target texture parameters to generate the recognition result.

15. The apparatus of claim 12, wherein if the format is a BMP format, the DCT is performed to the image by the DCT/IDCT device.

16. The apparatus of claim 14, further comprising:
    a grey level transform device, electrically connected to the DCT/IDCT device, for performing a grey level transform to the image before the DCT is performed by the DCT/IDCT device.

17. The apparatus of claim 12, wherein if the format is a JPEG format, the IDCT is performed to the image by the DCT/IDCT device.

18. The apparatus of claim 12, wherein the set of texture parameters comprise a first smooth texture energy ($E_{DC1}$), a first vertical/horizontal texture energy ratio [($E_{V1}/E_{H1}$)] and a first oblique texture energy ($E_{S1}$); the set of target texture parameters comprises a target smooth texture energy ($E_{DC}$), a target vertical/horizontal texture energy ratio [($E_V/E_H$)] and a target oblique texture energy ($E_S$), and the recognition result is generated by the comparing device according to $E_{DC1}$, $(E_{V1}/E_{H1})$, $E_{S1}$, $E_{DC}$, $E_V/E_H$, and $E_S$.

19. The apparatus of claim 18, wherein the recognition result (D) can be represented as:

$$D = a \times |E_{DC1} - E_{DC}| + b \times \left|\frac{E_{V1}}{E_{H1}} - \frac{E_V}{E_H}\right| + c \times |E_{S1} - E_S|,$$

wherein a, b, and c are weighing coefficients.

20. The apparatus of claim 12, wherein the set of target texture parameters corresponds to a target image, and the recognition result is a degree of similarity between the image and the target image.

21. The apparatus of claim 20, wherein N candidate images comprise the image, N is a positive integer, and each of the N candidate images corresponds to a candidate recognition result respectively, the apparatus further comprising:
a selecting device, electrically connected to the comparing device, for selecting a resulting image which is most similar to the target image from the N candidate images according to the candidate recognition results.

22. The apparatus of claim 12, further comprising:
a storing device, electrically connected to the DCT/IDCT device, for storing the set of DCT coefficients and/or the set of texture parameters.

* * * * *